United States Patent [19]

Hapka et al.

[11] Patent Number: 5,070,832
[45] Date of Patent: Dec. 10, 1991

[54] ENGINE PROTECTION SYSTEM

[75] Inventors: Roger J. Hapka, Columbus, Ind.; Dean S. Anderson, Cedar Falls, Iowa

[73] Assignee: Cummins Engine Company, Inc., Columbus, Ind.

[21] Appl. No.: 677,652

[22] Filed: Mar. 29, 1991

[51] Int. Cl.⁵ .............................................. F02B 77/00
[52] U.S. Cl. ................................ 123/198 D; 123/333; 123/335
[58] Field of Search ..................... 123/198 D, 333, 335

[56] References Cited

U.S. PATENT DOCUMENTS

| | | | |
|---|---|---|---|
| 4,148,289 | 4/1979 | Hewitt | 123/198 D |
| 4,653,445 | 3/1987 | Book et al. | 123/198 D |
| 4,729,355 | 3/1988 | Barnes | 123/342 |
| 4,771,746 | 9/1988 | Kobayashi | 123/333 |
| 4,794,897 | 1/1989 | Kinouchi | 123/198 D |
| 4,862,849 | 9/1989 | Wilson | 123/198 D |
| 4,890,590 | 1/1990 | Iwamoto et al. | 123/198 D |
| 4,911,121 | 3/1990 | Barnes | 123/198 D |
| 4,960,087 | 10/1990 | Junginer et al. | 123/198 D |

OTHER PUBLICATIONS

Cummins Engine Company, Inc. Internal memorandum proposing the engine protection system (Exhibits A through C) 7/91.

Primary Examiner—Noah P. Kamen
Attorney, Agent, or Firm—Woodard, Emhardt, Naughton, Moriarty & McNett

[57] ABSTRACT

An engine protection system and protocol is implemented within an electronic engine control module. Various engine fluid parameters, such as coolant level and temperature, oil pressure and temperature, and air intake manifold temperature, are monitored and compared to limit values to determine if a fluid fault condition exists as to one or more of the fluid parameters. The engine performance is derated as a function of the severity of the fluid parameter fault. Two levels of faults are sensed to activate one of two derating schedules. In one schedule, the engine power, or torque as a function of engine speed, is gradually reduced or derated as the fluid parameter moves farther out of normal operating range. With this derate schedule, the engine will still run and the driver can still operate the vehicle, albeit at lower power levels than a healthy engine. In a second schedule for more severe fault conditions, the maximum allowable engine speed is gradually reduced over a certain time period and to a certain percentage of the normal maximum engine rpm. Both schedules permit continued operation of the engine in a "limp home" mode for the less severe faults, and as required after a more severe fault to bring the vehicle safely to a stop. The engine portection system also stores an array of fault information that can be later access to investigate engine fluid parameter failures.

22 Claims, 7 Drawing Sheets

| | POWER DERATE | | | SPEED DERATE | | |
|---|---|---|---|---|---|---|
| Fluid Parameter | Level 1 Fault Condition | Derate As A Function Of | Maximum Level 1 Derate At | Level 2 Fault Condition | Derate As A Function Of | Maximum Level 2 Derate At |
| COOLANT LEVEL | BELOW $L_C$ | AMOUNT OF TIME BELOW $L_C$ | $t_{C1}$ | | | |
| COOLANT TEMPERATURE | EXCEEDS $T_{C1}$ (°F) | NO. DEGREES(°F) OVER $T_{C1}$ | $T_{C2}$ | EXCEEDS $T_{C2}$ | AMOUNT OF TIME OVER $T_{C2}$ | $t_{C2}$ |
| OIL PRESSURE | BELOW $P_{O1}$ (psi) | AMOUNT OF TIME BELOW $P_{O1}$ | $t_{O1}$ | BELOW $P_{O2}$ (psi) | AMOUNT OF TIME BELOW $P_{O2}$ | $t_{O2}$ |
| OIL TEMPERATURE | EXCEEDS $T_{O1}$ (°F) | NO. DEGREES(°F) OVER $T_{O1}$ | $T_{O2}$ | | | |
| AIR MANIFOLD TEMPERATURE | EXCEEDS $T_{A1}$ (°F) | NO. DEGREES(°F) OVER $T_{A1}$ | $T_{A2}$ | EXCEEDS $T_{A2}$ | AMOUNT OF TIME OVER $T_{A2}$ | $t_{A2}$ |

ENGINE PROTECTION SYSTEM

BACKGROUND OF THE INVENTION

This invention is concerned with control systems for the protection of internal combustion engines.

The need to protect internal combustion engines from damaging or destructive operating conditions is clear. Continued operation of an engine under critical low oil or low coolant conditions can lead to a catastrophic failure of the engine. Fluid monitoring and protection systems are used on engines to discourage operation of the engine when the operating conditions exceed acceptable limits. In the past, various systems of varying degrees of sophistication have been developed to monitor critical fluid conditions in the engine and to implement an engine protection protocol.

In perhaps the simplest such system, an analog gauge signals the advent of an unacceptable engine fluid condition—for instance, the low oil light. Driver warning systems of this type do not provide an ongoing indication of the development of an engine problem until the warning is issued. Analog or digital gauges provide continuous readings of fluid levels and temperatures, but require constant monitoring by the driver. Moreover, these systems provide no history of the engine fluid problems for analysis by those responsible for engine maintenance. More significantly, neither of these approaches automatically implement an engine protection protocol, relying instead on the driver to instinctively recognize the problem and take corrective or protective measures.

Aftermarket retrofit systems have been available that electronically monitor certain engine operating parameters. In some of these systems, the engine is automatically shut down when a critical engine operating parameter is exceeded. While engine shut-down is an effective way to prevent further damage to the engine, this approach greatly reduces the driver's ability to control the vehicle.

Automatic and continuous engine monitoring and control has been made more practical and efficient with the advent of electronics into the automotive and engine markets. The "PEEC" system of Caterpillar, the Detroit Diesel "DDECII" system, and the Cummins Electronics "CELECT" system are current examples of electronic engine controls that continuously monitor and control the operation of an internal combustion engine. Until now, these electronic control systems have relied upon engine shut-down or fixed power cutback for engine protection. In the former case, the engine is gradually but rapidly shut down through control of an electronic fuel valve. In the latter case, the available engine power is reduced across the entire operating range of the engine. This is achieved by limiting the maximum engine speed, such as in the Caterpillar "PEEC" system, or by limiting the percent available throttle, as in the Detroit Diesel system.

Each of the prior systems do provide absolute protection for the engine - that is, the engine is shut-down when a failure is detected. However, a need exists for an engine protection system that is "smarter", that can modify the engine operation to not only protect the engine but permit continued controlled operation of the engine. There is also a need for a system that can provide a history of engine fluid parameter fault conditions for diagnosis by maintenance personnel.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
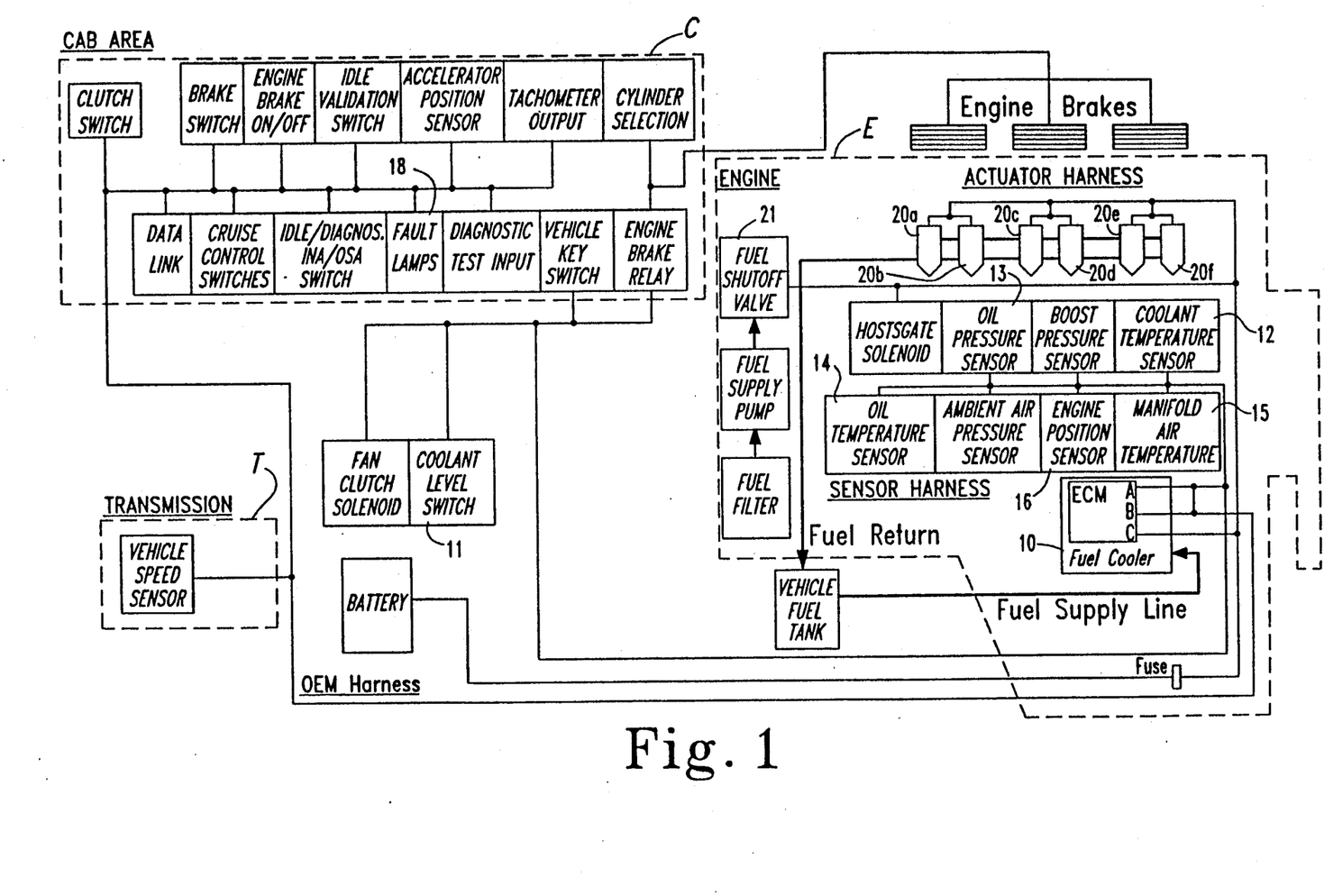
FIG. 1 is a schematic representation of the elements of an engine control system within which the engine protection systems of the present invention can be implemented.

The engine protection system of the present invention is adapted for implementation by electronic engine control systems, such as the Cummins CELECT system, schematically depicted in FIG. 1. The heart of this engine control system is an engine control module 10, ECM. The ECM 10 is a programmable microcomputer having digital and analog I/O capability and associated I/O interface circuitry. The ECM 10 receives input signals from a number of sensors located throughout the engine E and transmission T. Each of these signals provides a measure of the engine performance. Software within the ECM 10 evaluates the data received from these sensor signals and uses this information to govern the engine operation. For purposes of the present invention, the primary sensors are the coolant level switch 11, coolant temperature sensor 12, oil pressure sensor 13, oil temperature sensor 14, and manifold air temperature sensor 15. Each of these sensors can be of well-known construction, the important aspect relative to the present invention being the provision of a signal in relation to a sensed fluid condition in the engine E. An engine position sensor 16 provides a signal indicative of engine crankshaft rotation to the ECM 10 for use in calculating engine speed.

The ECM 10 receives the signals from the various engine sensors and provides a number of output signals.

Some output signals are provided to the console C in the cab of the vehicle. Among the several analog and digital displays on the console C providing information to the driver are a number of fault lamps or warning lights 18. Of primary importance among the output signals from the ECM 10 are control signals which govern the engine timing and fuel supply. More specifically, the ECM 10 sends control signals to a number of fuel injectors $20_a$–$20_f$ and a fuel shutoff valve 21. The fuel shutoff valve 21 can be controlled by the ECM 10 to stop the flow of fuel to the fuel injectors 20, thereby shutting down the engine E. The fuel injectors 20 can be known electronically controlled injectors which control the amount of fuel in a given fuel charge as well as the timing of the injection of the charge.

The ECM 10 implements software which controls the engine power and speed by controlling the fuel injectors 20. Other software in the ECM maintains values indicative of the engine speed and power for comparison to engine performance tables or maps, for example, stored in memory within the ECM. Numerous protocols can be administered by the ECM 10 to control the performance of engine E during normal operation. The details of the ECM 10 can be left to a person of ordinary skill in the art of electronic engine control. Typical electronic control systems are described in SAE publication SP-673 entitled "Electronic Controls of Diesel Engines", 1986. Most electronic engine control systems include a microprocessor, I/O modules for digital and analog data, electronic memories such as RAMs, ROMs, PROMs and EEPROMs, and a data link to permit external input of engine operating parameters, such as governed engine speed. The microprocessor is programmed to execute various control algorithms, which are also within the skill of persons in the electronic engine control art. For the present purposes, it is sufficient to indicate that these algorithms can control fuel charge and injection timing as determined by predetermined engine governed speed and power (rated torque) curves.

The present invention concerns modifications to the engine control protocol to protect the engine when a sensed fluid parameter moves out of a predetermined normal operating range. The engine protection protocol of this invention can be incorporated into the engine control software of most electronic engine control systems. The engine protection aspect of the engine control system is depicted more particularly in FIG. 2. The ECM 10, and more specifically the microprocessor of the ECM, executes software code for engine control routines designated generally as 30. The engine control routines 30 include a fuel quantity routine 31 and an injection timing routine 32 which control the fuel injectors 16 during normal engine operation. The engine control routines 30 also include an algorithm to determine engine speed (r.p.m.) from the crankshaft angular position signal generated by the engine position sensor 16. In the present system, the engine rpm is computed for every 100 degrees of crankshaft rotation.

Figure 2:
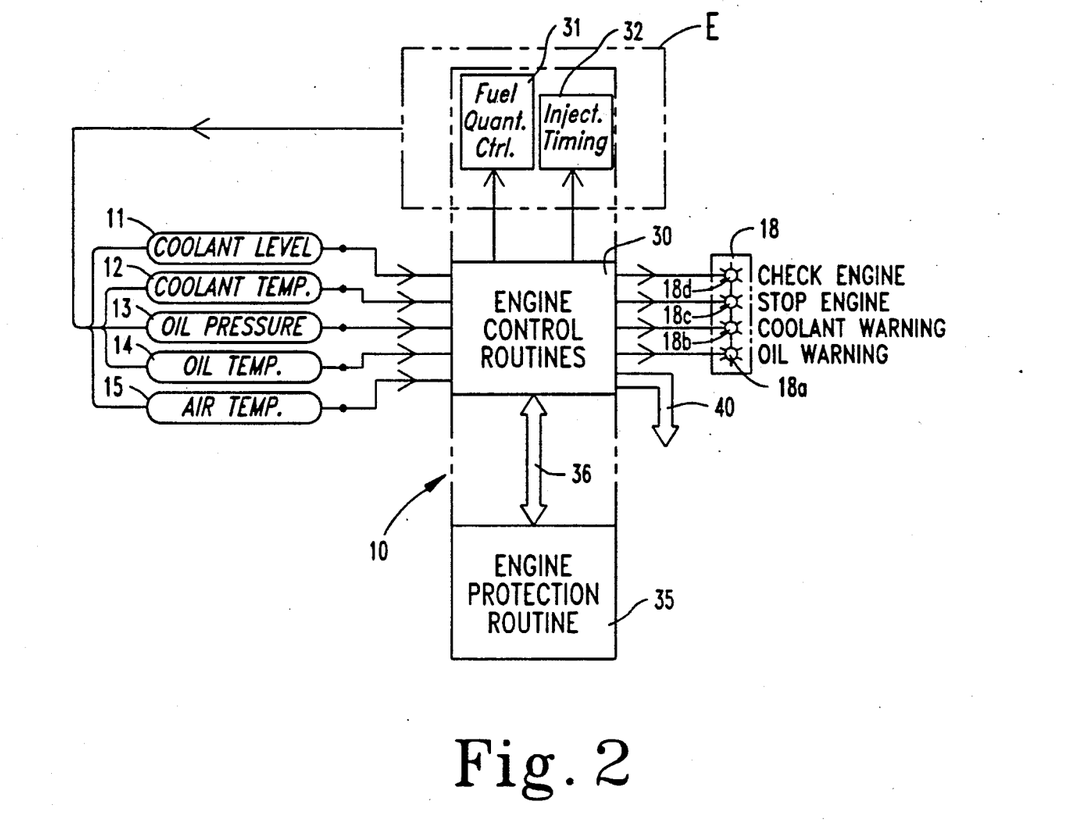
FIG. 2 is schematic representation of the primary elements of the engine protection system.

Integral with the engine protection system of the present invention, is software code for an engine protection routine 35 stored and executed within the ECM 10. The primary function of this software routine 35 is to gradually reduce or derate the engine power and speed as a function of fluid parameter fault conditions to protect the engine from catastrophic failure. For less severe fault conditions, the engine protection routine 35 cuts back the engine operation to predetermined levels that permit the driver to continue in a "limp home" mode. That is, the driver can continue to drive the vehicle with the engine limited to reduced power and speed operation that avoids catastrophic failure of the engine. For more severe fault conditions, the engine protection routine 35 allows the engine to continue operating at gradually reduced power and speed until the engine is in a "shutdown" mode. The driver is then permitted some engine power to safely bring the vehicle to a stop, as opposed to other known systems that automatically, and possibly unsafely, shut the engine down.

The engine protection routine 35 receives data from the several engine fluid sensors including: the coolant level switch 11, which is triggered when the fluid level of the engine coolant falls below a predetermined value; the coolant temperature sensor 12, which provides a signal indicative of the coolant temperature; the oil pressure sensor 13, which provides a signal proportional to the engine oil pressure; the oil temperature sensor 14, which provides a signal proportional to the engine oil temperature; and the manifold air temperature sensor 15, which provides a signal related to the engine air intake temperature. Each of these signals is compared within the engine control modules to out of range limit values in memory to determine whether a fault condition exists for a particular engine fluid parameter. The out of range limit values may be single values, such as maximum coolant temperature, minimum coolant level, or maximum oil temperature, or a table of values based upon engine speed, such as oil pressure as a function of engine rpm.

The engine protection routine 35 receives and sends information to the engine control routines 30 through internal communication means 36. The engine protection routine 35 processes sensor signals to determine if a fault condition or conditions exist and then returns engine derating information to the engine control routines 30. This engine derating information is used by the fuel quantity control and injection timing modules 31 and 32 to limit engine power and speed below normal operating conditions. In other words, the engine protection routine 35 provides information to the engine control routines 30 that overrides normal engine operation as required to protect the engine. In the preferred embodiment, this engine derating information constitutes an index or reducing multiplier to be applied to the engine performance algorithms executed by the engine control routines 30.

The engine protection routine 35 executes software code that defines a power derate schedule and a speed derate schedule, depending upon the severity of the fault condition. For less severe faults, the power derate schedule is implemented. Under the power derate schedule, the engine is capable of operating at all speeds within its governed speed range, but the engine torque is reduced to certain percentages of the engine rated torque depending upon the degree of the fluid parameter fault. As previously expressed, under lesser fault conditions, the driver can still drive the vehicle in a "limp home" mode, since the full engine speed range is maintained. However, when the fault conditions increase to a greater level, the speed derate schedule is implemented. Under this schedule, the engine speed is gradually reduced to allow the driver to bring the vehicle to a controlled stop.

Figure 3:
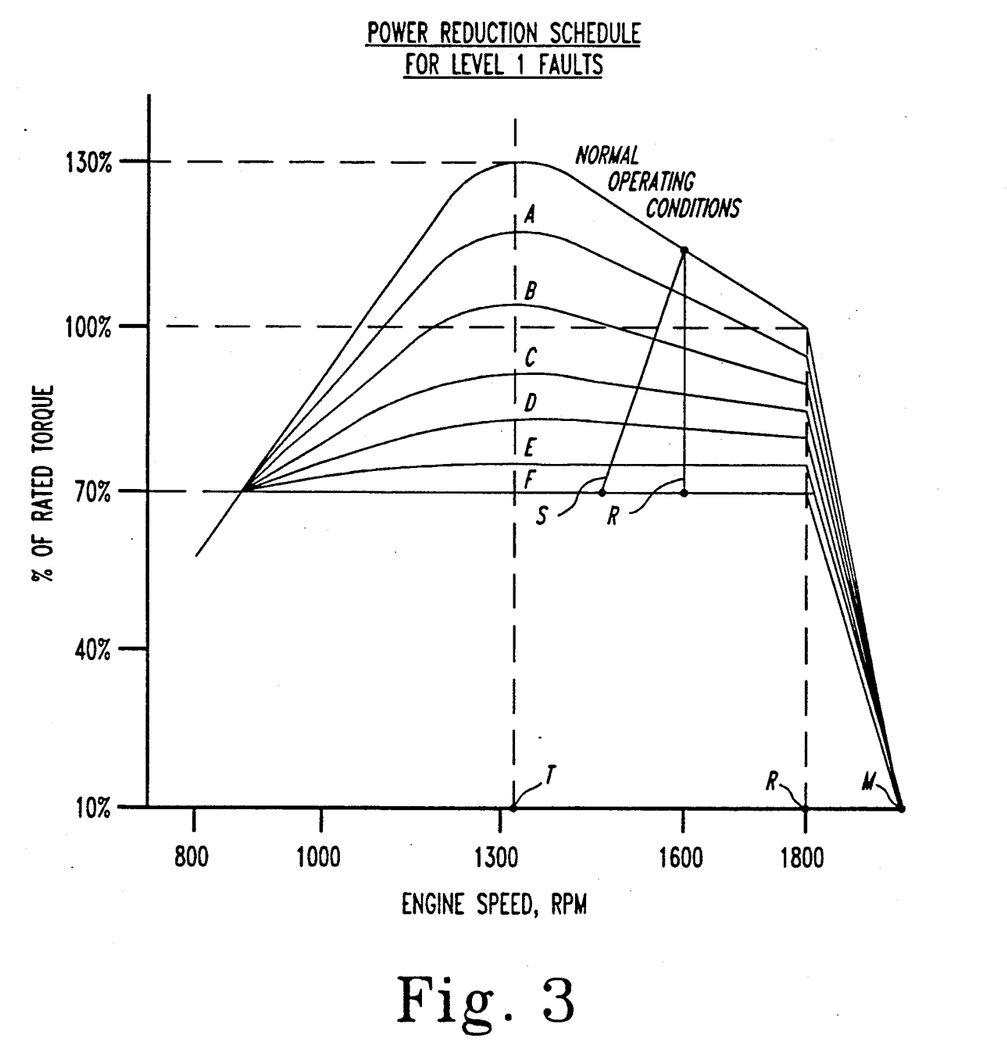
FIG. 3 is a graph representing one engine performance reduction or derating schedule executed by the engine protection system of the present invention for a first level of fluid parameter fault.

The power derate schedule for one embodiment of the invention is graphically depicted in FIG. 3, which shows a family of torque-speed curves over the operating speed range of the engine. The uppermost curve is the torque-speed curve implemented by the engine control routines 30 during normal engine operation. The remaining curves correspond to different fault degrees, with fault degree A being the least severe and fault degree F being the harshest. At each fault degree, a modified torque-speed curve replaces the normal operating conditions curve to reduce the engine torque across the entire engine speed range. Although discrete fault degrees A-F are shown, a continuum of fault modified curves are obtained by the present invention. A number of discrete fault degrees have been charted for illustrative purposes to show the manner in which the torque-speed curve is derated as the fluid parameter fault condition becomes more severe.

It is apparent from FIG. 3 that the amount that the engine torque is derated increases with increasing fault degree. However, at no point is the torque derated to less than 70% of the engine rated torque. The rate of power decrease at the peak torque speed, point T on FIG. 3 (about 1310 rpm for one specific engine), is greater than the rate of power decrease at the engine rated speed, point R (1800 rpm in the specific example). In other words, when the engine is being operated at the peak torque speed T, the maximum allowable engine torque (as a percentage of rated torque) is derated or reduced more quickly from fault degree A to fault degree B, for instance, than if the engine is being operated at the rated speed R. This feature of the present invention causes the driver to downshift at lower engine speeds because the performance reduction at the lower speeds will become undesirable. Downshifting allows the engine to operate at higher crankshaft rpms for a given vehicle speed, which facilitates engine cooling since the engine cooling system is more effective at higher speeds.

When more severe fluid parameter fault conditions are encountered, the speed derate schedule is implemented by the engine protection routine 35. This schedule is graphically depicted in FIG. 4 which shows a family of curves plotting percent of rated torque on the ordinate versus percent of maximum engine speed on the abscissa. Each curve originates from the maximum engine speed, point M on FIGS. 3 and 4 (which is about 1950 rpm for one specific engine). (Note that the peak torque speed point T corresponds between the two figures). According to the speed derate or reduction schedule, the maximum engine speed at which the engine is permitted to run during the engine protection protocol is reduced from the normal operating conditions speed at the rightmost line on the graph. (As with the fault degrees A-F, the speed derate schedule is broken down into discrete fault degrees G-L for illustrative purposes). In the preferred embodiment, the maximum allowable engine speed is reduced with each fault degree G-L down to a minimum of 70% of the absolute maximum engine speed M.

Figure 4:
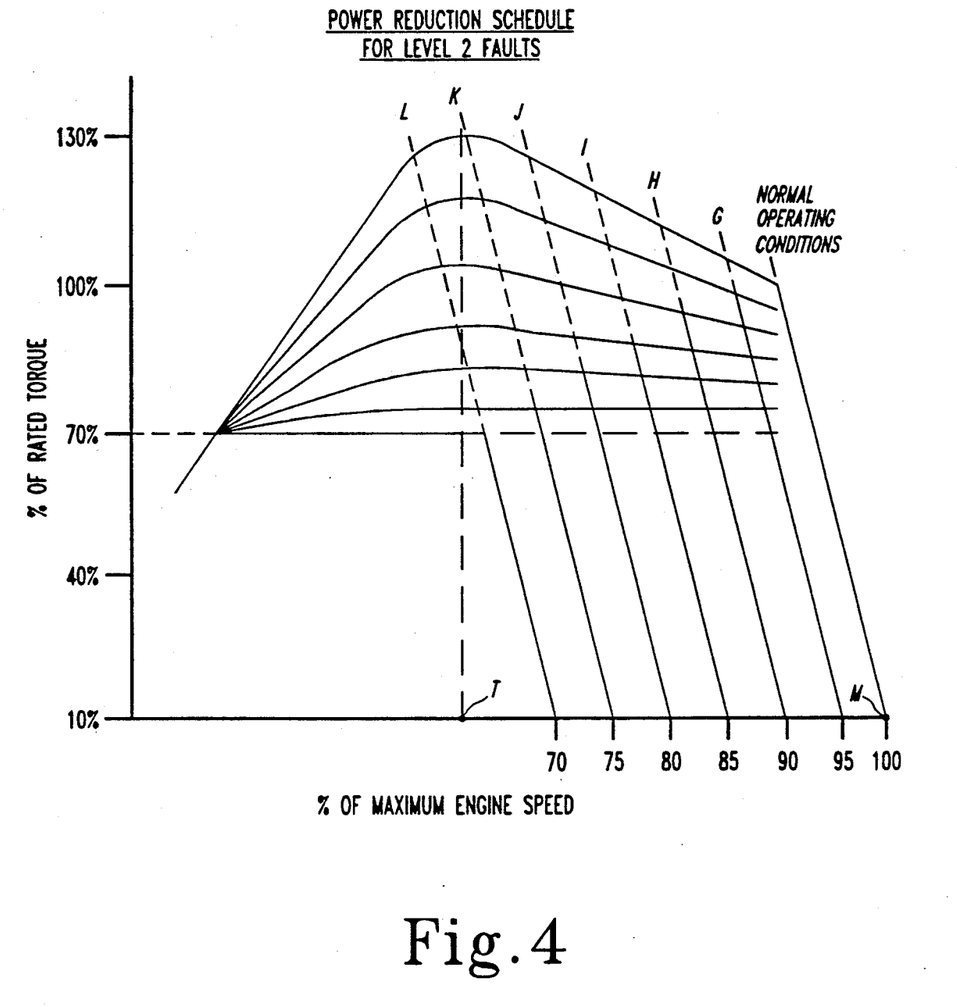
FIG. 4 is a graph representing another engine performance reduction or derating schedule executed by the engine protection system of the present invention for a second level of fluid parameter fault.

According to the present invention, the advent of any of the fault degrees A-L represented in FIGS. 3 and 4 is determined by analysis of the fluid parameter information provided through the ECM 10 from the various fluid sensors. Whether engine protection and derate is called for depends upon a comparison of each of the fluid parameters to various limit values, which values are stored in ROM in the ECM 10. According to the preferred embodiment, five types of engine fluid fault conditions can arise: (1) low engine coolant level; (2) high coolant temperature; (3) low oil pressure; (4) high oil temperature; and (5) high manifold air temperature.

Figure 5:
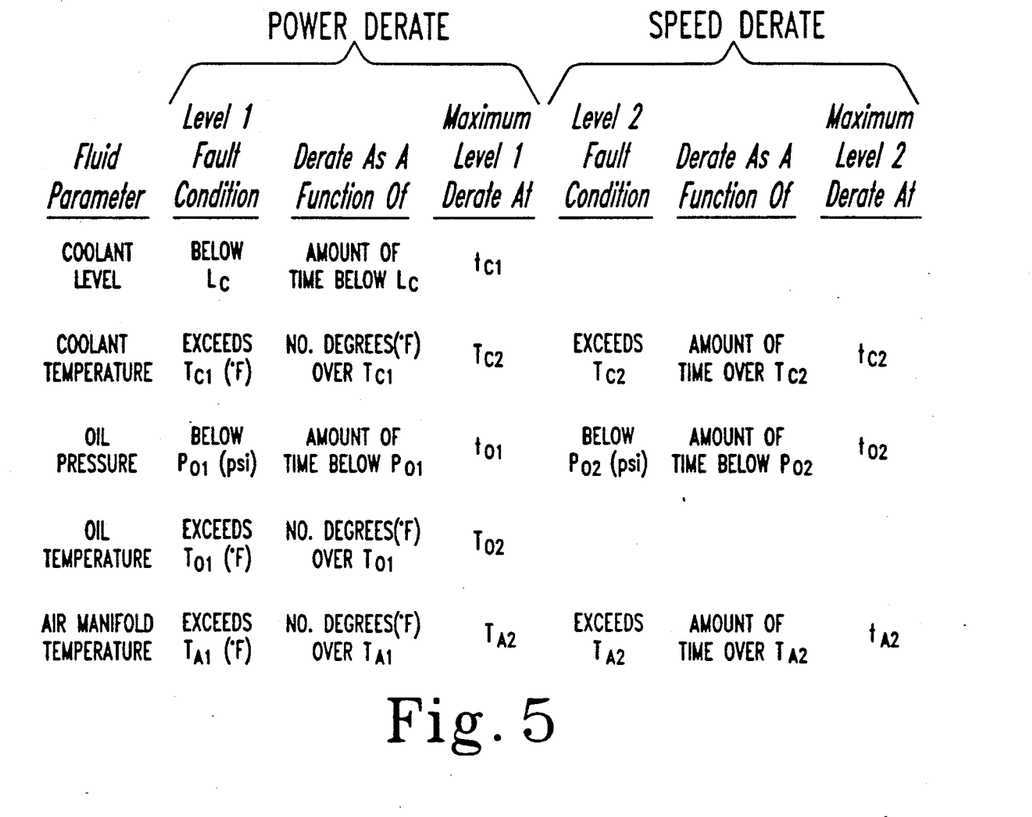
FIG. 5 is a table showing the engine performance derating characteristics for a number of engine fluid parameter fault conditions.

The table of FIG. 5 shows the engine derate characteristics produced by the engine protection routine 35 as a function of the five types of engine fault conditions. According to the preferred embodiment, the power derate schedule is applied for a "Level 1" fault, as shown at the left side of the table in FIG. 5, while the speed derate schedule is applied for "Level 2" faults along the right side of the table. For example, the coolant level, as sensed by the coolant level sensor 11, triggers a Level 1 fault condition when the level falls below a value $L_C$. When this fault condition is detected, the engine power is derated as a linear function of the amount of time, in seconds, that the coolant level remains below the coolant low level limit $L_C$. When the coolant level has been below $L_C$ for an amount of time equal to $t_{C1}$, the engine power will have been derated by its maximum amount, or down to 70% of its rated torque as shown in FIG. 3. A software clock in the ECM 10 is used to measure the amount of time over which the low coolant level fault has been maintained. As this amount of low coolant fault time increases, the fault degree increases from degree A to degree F at $t_{C1}$. The engine power is derated linearly according to the equation: $255*(time)/t_{C1}$, where 255 is a scaling factor for computing purposes and the variable "(time)" is the increasing amount of time in the low coolant fault condition. In one specific embodiment of the ECM 10 and engine protection routine 35, the time to maximum power derate for a low coolant level fault $t_{C1}$ is 24 seconds.

While the engine power derating schedule has been shown in FIG. 3 as occurring at discrete fault degrees A-F, the power derating occurs as a continuous function between the lowest and highest fault degree. If the engine is operating at a fixed speed, such as 1600 rpm, during a power derate, the peak torque capability of the engine will be decreased over time along line R in FIG. 3. If the engine speed is gradually decreased, the peak torque is reduced along line S, which yields a non-linear decrease in actual engine torque or power.

Referring again to FIG. 5, the engine derate characteristics for a coolant temperature fault is shown in the second row of the table. The first fault condition, or Level 1 fault, occurs when the coolant temperature sensor 12 reports a coolant temperature that exceeds $T_{C1}$. At this point, a fault degree A event has occurred according to the power reduction schedule of FIG. 3. The engine power is continuously derated as long as the coolant temperature exceeds $T_{C1}$ as a linear function of the number of degrees (°F) over $T_{C1}$. In other words, as the coolant temperature increases over its Level 1 fault temperature $T_{C1}$ the amount that the engine power is derated increases. The engine power is derated until the coolant temperature reaches the temperature $T_{C2}$, at which point the engine power has been derated its maximum amount of 70% of rated torque. If the temperature stabilizes at a certain value above $T_{C1}$ but below $T_{C2}$, the power derate percentage will remain constant, although the engine torque output or power may change as the engine speed changes.

With a Level 1 fault, the engine power is derated according to the equation: $255*((temp)-T_{C1})/(T_{C2}-T_{C1}))$, where 255 is a scaling factor and the variable "(temp)" is the temperature reading provided by the coolant temperature sensor 12. For one specific diesel engine, the Level 1 coolant temperature fault value $T_{C1}$ is 220° F., while the Level 2 value $T_{C2}$ is 238° F. Thus, the engine power derate equation for a coolant temperature fault becomes: 225*((temp)−220)/(238−220).

A coolant temperature fault has greater potential for catastrophic engine failure than a coolant level fault. Thus, a second level of fault condition is monitored by the engine protection routine 35 of the present invention. This Level 2 fault condition occurs when the coolant temperature exceeds $T_{C2}$ (which must necessarily be greater than $T_{C1}$). During this fault condition, the engine speed is derated as a linear function of the amount of time at which the engine coolant temperature exceeds the limit temperature $T_{C2}$. The Level 2 maximum engine speed is continuously derated or reduced according to the curves in FIG. 4, until an amount of time $t_{C2}$ has been reached, at which point the engine speed has been reduced to 70% of its normal operating maximum. The equation for this Level 2 engine speed derate is the same as the coolant level fault derate equation, with the appropriate variables substituted. In the specific embodiment, the time to maximum engine speed derate $t_{C2}$ is 24 seconds.

Figure 6:
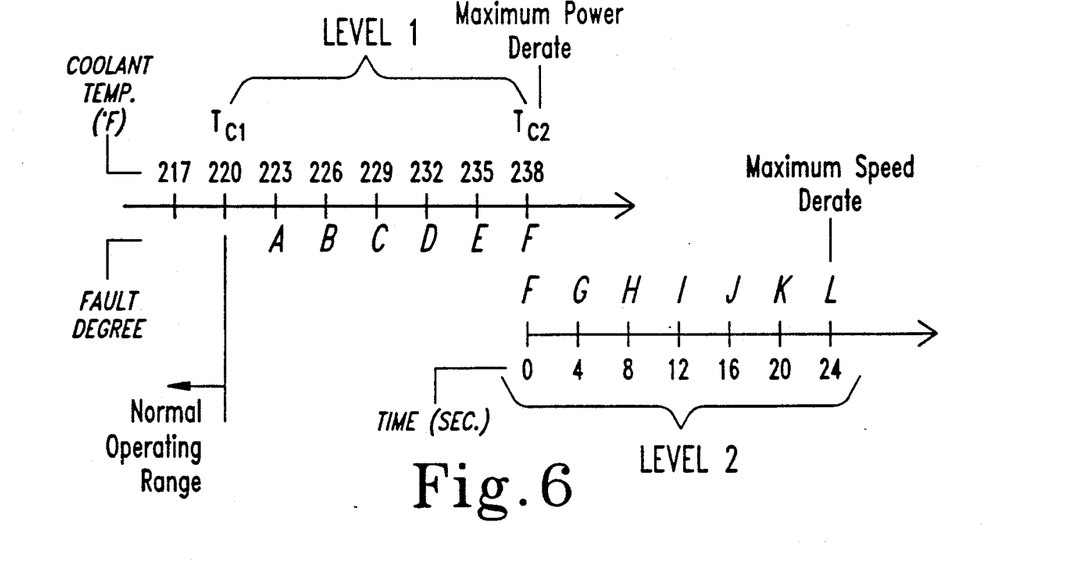
FIG. 6 is a line graph depicting the engine performance derating characteristics for one engine fluid parameter in a fault condition.

For illustrative purposes, the coolant temperature fault characteristics are depicted on a line graph in FIG. 6. The upper line corresponds to a Level 1 coolant temperature fault condition over the range of temperatures between $T_{C1}$ and $T_{C2}$. The lower line corresponds to a Level 2 coolant temperature fault condition during which the coolant temperature exceeds the upper temperature limit $T_{C2}$. In the preferred embodiment, software code executed by the engine protection routine 35 applies the linear equations for the two fault levels described above. However, for simplicity, discrete fault degrees A-F for the Level 1 fault condition and G-L for the Level 2 fault condition have been identified. These fault degrees correspond to the like labeled curves on the power derate schedule of FIG. 3 and the speed derate schedule of FIG. 4.

As can be seen from the line graphs of FIG. 6, as the coolant temperature increases, say from 223° to 226°, the fault degree increases from degree A to degree B, and the engine power curve changes according to the curves A and B in FIG. 3. Once the coolant temperature reaches the upper limit $T_{C2}$ of 238° F., the actual coolant temperature is no longer considered. Instead, the amount of time that the coolant temperature is above the upper limit $T_{C2}$ is used to increase the fault degrees and ultimately derate the engine speed via the speed curves of FIG. 4.

Returning to FIG. 5, the oil pressure fault derate characteristics are set forth in the third row of the table. Like the engine coolant level fluid parameter, the oil pressure parameter has two fault levels. For a Level 1 fault, the oil pressure measure by the oil pressure sensor 13 falls below a low pressure limit $P_{O1}$. At this Level 1 fault condition, the engine power is derated or reduced linearly as a function of the amount of time over which the oil pressure remains below the low pressure limit $P_{O1}$, to a time $t_{O1}$ at which the maximum power derate occurs. In this respect, the power derate for a Level 1 low oil pressure fault is the same as the power derate for a low coolant level fault.

If the oil pressure falls below a very low oil pressure limit $P_{O2}$, a Level 2 fault condition arises necessitating application of the engine speed derate schedule. Like the Level 2 coolant temperature fault condition, the engine speed derate is a linear function of time below the very low oil pressure limit $P_{O2}$. The maximum Level 2 derate for an oil pressure fault occurs at a time of $t_{O2}$ after the oil pressure falls below the limit $P_{O2}$. The oil pressure sensed by the oil pressure sensor 13 is compared to two low oil pressure limits—$P_{O1}$ and $P_{O2}$, where $P_{O1}$, a Level 1 fault condition, is greater than $P_{O2}$, a Level 2 fault condition. It may be that during vehicle operation the oil pressure falls below the first low oil level $P_{O1}$ but never drop below the second very low oil level $P_{O2}$. In this circumstance, only the engine power derate schedule will be applied to protect the engine. The engine can still be operated indefinitely at the maximum power derate (70% of rated torque) for the Level 1 fault condition, at least until a more sever fluid parameter condition is encountered.

Figure 7:
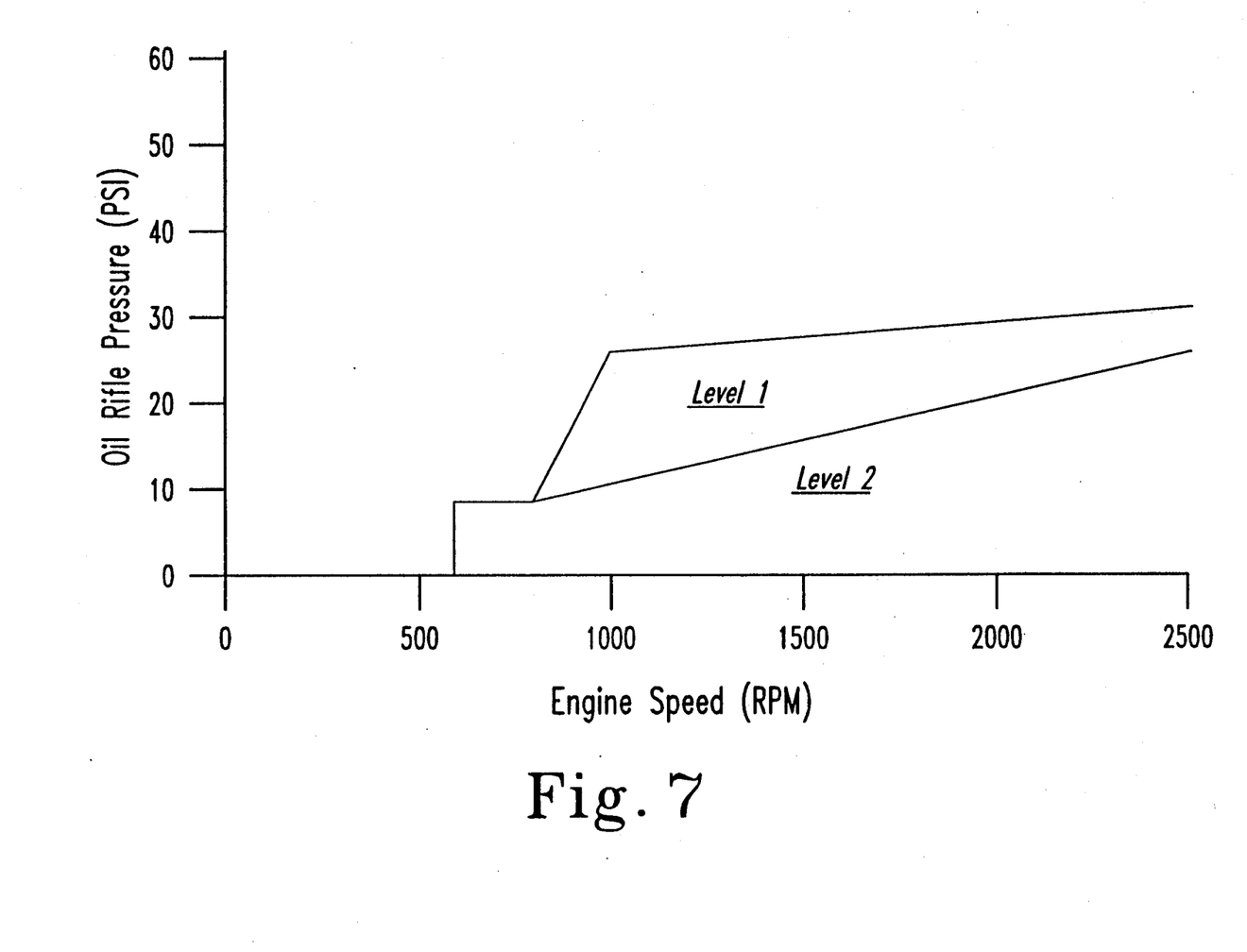
FIG. 7 is a graph showing engine oil pressure fault levels as a function of engine speed for one specific embodiment of the invention.

Unlike the other engine fluid parameters, the oil pressure parameter is a function of engine speed. Thus, the two low oil pressure limits $P_{O1}$ and $P_{O2}$ will also vary as a function of engine speed. For one specific engine, these low oil pressure limits are shown in the graph of FIG. 7. The engine engine protection routine 35 can include software code to calculate the two low oil pressure limits as a function of the engine speed obtained from calculations made by the engine control routines 30. Alternatively, the engine protection routine 35 can implement a table look-up from data stored in memory within the ECM 10.

The oil temperature monitored by the oil temperature sensor 14 is compared to a high temperature limit $T_{O1}$ to determine whether a Level 1 fault condition exists. If so, the engine power is derated in the same manner as a Level 1 coolant temperature fault condition, with the maximum power derate occurring when the oil temperature has reached a higher second temperature $T_{O2}$. No further engine derate occurs for an oil temperature fault condition, even if the oil temperature exceeds the second temperature $T_{O2}$. Thus, the vehicle can still be driven in the "limp home" mode. Naturally, if the engine oil temperature gets too high, other engine and fluid fault conditions will arise which will trigger other engine protection protocols. For one specific engine, the temperature $T_{O1}$ is 258° F. and the temperature $T_{O2}$ is 282° F.

The last fluid parameter indicated in FIG. 5 is the air intake manifold temperature, which is monitored by the air temperature sensor 15. The Level 1 and Level 2 engine derate characteristics of an air temperature fault condition is similar to the coolant temperature fault derate characteristics, although the limit temperatures $T_{A1}$ and $T_{A2}$ and maximum Level 2 derate time $t_{A2}$ may be different. In the specific embodiment, the air temperature fault values are 180° F. for $T_{A1}$, 220° F. for $T_{A2}$, and 24 seconds for $t_{A2}$.

Thus far, the above discussion has assumed that the engine fluid parameter moves farther out of normal operating range over time. The engine coolant temperature may generate a Level 1 fault condition and increasing fault degrees to fault degree C, for example, only to return to its normal operating temperature below 220°. Since the engine derate is based upon calculations according to a linear equation, as the coolant temperature falls the amount of engine power derate decreases, or the amount of available engine torque increases until it has reached the normal operating torque curve. The engine protection routine constantly monitors all of the fluid parameters to determine whether a fault condition continues to exist. Once the fault condition ceases, the engine protection protocol is abandoned and the engine control routines 30 are permitted to resume their normal functions.

Under some conditions, a fluid parameter may exceed normal limits for only a brief time and then return to the normal operating range. The engine coolant level and oil pressure have been found to be susceptible to relatively instantaneous but short-lived excursions beyond normal limits. To compensate for this phenomenon, the engine protection routine 35 incorporates a delay in its analysis of the coolant level and oil pressure parameters once a fault condition has been initially signalled. In one embodiment, a coolant level fault or oil pressure fault must be sensed for 30 seconds before the Level 1 power derate schedule is applied.

In another circumstance, a fluid parameter may rapidly jump from normal operating values to a degree D fault condition or to a Level 2 fault condition, for example. According to the engine derate characteristics of each of the fluid parameters, and more specifically according to the linear engine derate equations, the engine power and speed derates would occur as rapidly as the change in the fluid parameter. Sudden fluid parameter changes result in sudden changes in engine power and speed, which may be detrimental to the operation of the vehicle. Consequently, the engine protection routine 35 includes a filter means to control the engine derate when sudden fluid parameter changes occur. In the preferred embodiment, this filter means employs a first order filter for sudden fluid parameter changes into the Level 1 fault range and a second order filter for changes into the Level 2 fault range. When an immediate Level 1 fault is detected, the filter means forces the power derate to occur over a 30 second time period. By way of example, if the engine coolant temperature increases from the 217° F. normal operating temperature to a degree C Level 1 fault temperature of 229°, the first order filter of the filter means will cause the engine power to be derated to the degree C curve (FIG. 3) over a period of 30 seconds. The same 30 second time span is applied if the coolant temperature jumps from 217° to the maximum power derate fault temperature of 238° F.

If the fluid parameter jumps from its normal operating value to a Level 2 fault condition, a second order filter is applied in addition to the first order filter. The second order filter enforces a linear engine speed derate over an additional 24 second interval. For example, if the engine coolant temperature jumps from 217° to 240° beyond the Level 2 temperature fault value, the engine power is first derated to its maximum 70% rated torque derate over a 30 second interval by the first order filter. According to the Level 2 speed derate schedule the engine speed would normally also be derated during this 30 second interval because a Level 2 fault temperature has been detected. However, the second order filter is applied after the engine power has been derated, or after the first 30 second interval has passed, to derate the engine speed to its maximum derate value over a 24 second period. The presence of the filter means, including its first and second order filters, produces orderly engine power and speed reductions even when a fluid parameter suffers sudden changes in the fault ranges.

In the preferred embodiment, the filter means is effected by first determining the fault level and degree. In the case of the first order filter, the power derate for the particular fault degree is calculated according to the normal power derate schedule and equation. The actual power derated is obtained by linearly increasing the engine derate as a function of time with the calculated derate being achieved after 30 seconds. In this respect, the first order filter operates in the same manner and is implemented within the engine protection routine in the same way as the time dependent power derate schedule applied for a low coolant level or low oil pressure Level 1 fault condition.

If the fluid parameter has entered the Level 2 fault envelope, the first order filter is applied to derate the engine power and then the second order filter applied to derate the speed. In this instance, the second order filter operates like the Level 2 fault speed derate, having been only shifted in time by the 30 second interval of the first order filter.

In another aspect of the invention, various lamps among the fault lamps 18 on the cab console C are illuminated according to the fault level and degree. Included in the fault lamps 18 is a coolant warning lamp 18a, an oil warning lamp 18b, a "Check Engine" lamp 18c and a "Stop Engine" lamp 18d. The coolant warning lamp 18a and oil warning lamp 18b are illuminated when the corresponding fluid parameter limits are exceeded. These lamps give the driver an indication of which of the monitored engine fluids is outside the normal operating range. Alternatively, the lamps 18a and 18b can be replaced by a single "Fluid Warning" lamp which signals the advent of an engine fluid parameter fault. The engine protection features of the invention are brought to the driver's attention through the warning lamps 18a and 18b. In one embodiment, a fluid warning lamp (18a or 18b) can be illuminated when a fluid parameter approaches a limit value. For instance, for the engine coolant, the lamp 18a can be energized when the coolant temperature reaches 212° F., which is below the 220° limit temperature but close enough to the higher temperature to suggest that a fault condition has arisen in the engine coolant system.

In the first level of fault, the fluid warning lamp 18a or 18b initially constantly illuminated. As the fluid parameter moves to higher fault degrees, the lamp is then blinked, nominally at 2–3 Hz., to attract the driver's attention to an imminent engine failure. It is understood that the same functions can be applied when a single "Fluid Warning" lamp is used. In this instance, any fluid parameter fault would cause the single lamp to be energized.

In still another aspect of the engine protection system of the present invention, the ECM 10 is connected to an input/output datalink 40. This datalink 40 provides means for a vehicle operator to enter certain engine operating values. The datalink also provides means for outputting engine fault information produced by the engine protection routine 35. The engine protection routine 35 maintains a constantly updated stored record of the number of occurrences of faults in each of the fluid parameters. Over the life of a particular engine, a fluid parameter fault counter is maintained for each of the five fluid parameters monitored in the preferred embodiment. Each time a fault occurs in a fluid parameter, its corresponding fault counter is incremented.

In addition, the engine protection routine 35 includes an internal engine hour clock that maintains the amount of time elapsed in the life of a specific engine being monitored and controlled by a particular ECM 10. The engine protection routine 35 reads the engine hour clock and maintains a record in memory of the engine hour reading when each fluid parameter fault occurs. The routine 35 also measures the elapsed time that the fluid parameter has spent out of the normal operating range. A table is maintained in memory of data for each occurrence of a fault in each fluid parameter including the engine hour reading, the elapsed time of the fault, the total number of faults and the total elapsed time of all the faults. As another feature of the engine protection routine, the maximum fluid temperatures (coolant, oil and manifold air) are stored and constantly updated over the life of the engine.

By a suitable data reader, the vehicle operator or engine maintenance personnel can access the engine fault information stored in memory when the engine is not being run. This information provides a more complete picture of the engine's performance over its life than has been heretofore available. Chronic problems with a given fluid system can be readily diagnosed with the information maintained by and read from the engine protection routine 35. Moreover, the root of a specific engine failure can be detected by comparing the engine hour readings of the occurrence of multiple fault conditions.

Figure 8:
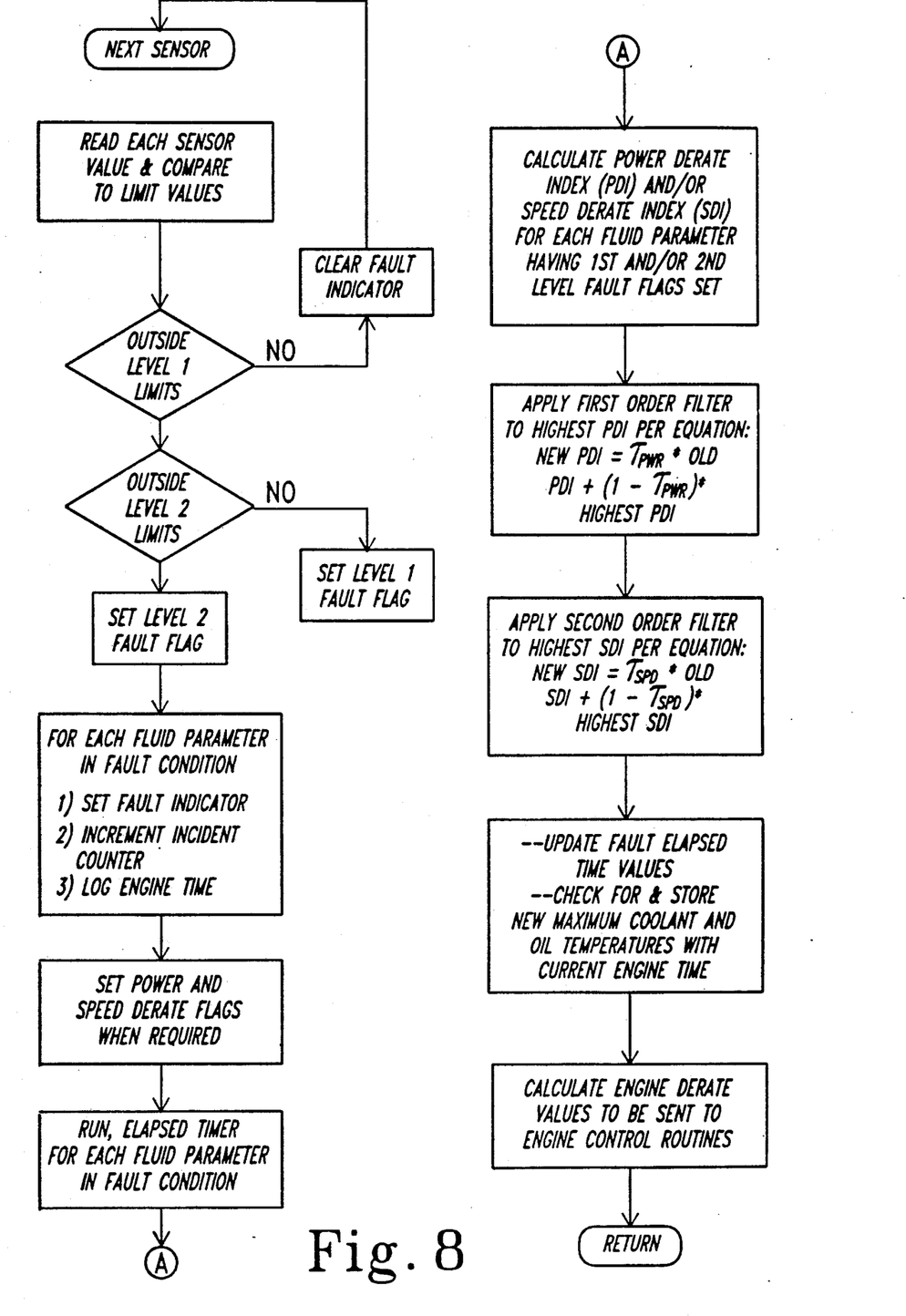
FIG. 8 is a flowchart of the engine protection protocol as executed by the engine protection system of the present invention.

A flowchart for one embodiment of the present invention is shown in FIG. 8 which outlines the general steps in the engine protection protocol to be carried out by the engine protection routine 35. In a background procedure, each of the fluid parameter sensors 11–15 is interrogated and the resulting value compared to fluid parameter limit values set by the vehicle operator. In one specific embodiment, the sensors are interrogated every 50 milliseconds. Tests are made to determine whether a Level 1 or a Level 2 fault condition exists or is continuing, or whether the fault has passed. The tests are made for each of the five fluid parameters of the preferred embodiment. For each fluid parameter that first exceeds normal limits, a fault indicator is stored in memory, it corresponding fault incident counter is incremented, and the engine time that the fault first occurred is logged in memory. When the fault in a fluid parameter is first detected and its severity determined, an elapsed fault timer is commenced and maintained until the fault ends or the engine is shut down, after which the total elapsed time is stored in memory with the specific fluid parameter fault indicator.

Depending upon the fault level determination, flags are set to indicate whether engine power or speed derate is called for under the engine protection protocol. Normally, the speed derate flay is not set until after an engine power derate has occurred. However, under certain fluid fault conditions it may be desirable to permit both engine power (torque) derate and speed derate to occur at substantially the same time.

Engine derate indices are calculated in a next step in the engine protection sequence. If the power derate flag is set, a power derate index, or PDI, is calculated for each out-of-range fluid parameter according to the equations set forth above and described in the table of FIG. 5. If the speed derate flag is set, a speed derate index, or SDI, is calculated for each out-of-range fluid parameter according to the corresponding speed derate equations set forth above. In the preferred flowchart of FIG. 8, the optional filters are then applied to the engine derate indices, PDI and SDI. The first order filter is implemented by first determining which PDI of which fluid parameter is the highest. The filter is then applied to this highest PDI according to the following filter equation stored in memory within the engine protection module: New PDI=$t_{pwr}$*Old PDI+$(1-t_{pwr})$* Highest PDI. In this equation, "New PDI" is a filtered index value, "$t_{pwr}$" is a filtering time constant, "Old PRI" is a filtered PDI calculated in the last loop through the engine protection protocol, and "Highest PDI" is the highest value from the most recently calculated PDIs for all the faulted fluid parameters. The second order filter implements a similar equation applied to the speed derate index SDI to produce a filtered index.

After the derating indices have been calculated the engine protection routine 35 updates the elapsed time values for each faulted fluid parameter. A check is also made to determine whether a new maximum coolant temperature or oil temperature has been detected. If so, this new value is stored in memory along with the engine time at which the respective temperature occurred.

The manner in which the derating indices PDI and SDI, whether filtered or not, are used by the engine control routines 30 depends upon the programming of those routines. In one embodiment, actual engine operating values are calculated in the engine protection routine 35, based upon the normal magnitude of those values, the amount of derate called for by the PDI and/or SDI, and the magnitude of those engine operating parameters at their maximum derated condition. In this embodiment, two engine operating values are used by the engine protection routine 35 to alter engine performance—maximum engine speed and maximum engine torque at a certain engine speed. The maximum engine speed is calculated according to the following equation: (rated speed—maximum derated speed)* SDI/255, where the "rated speed" is the normal maximum rated engine speed and "maximum derated speed" is the engine speed for the maximum derate of the engine, nominally 70% of the rated speed.

The maximum engine torque is a function of the engine speed and is determined according to the equation: PDI/255 * maximum derated torque[rpm] +(1−PDI/255) * normal torque[rpm]. In this equation, the maximum derated torque as a function of rpm can be predetermined and held in a table in memory. Nominally, the torque at the maximum amount of engine derate is 70% of the engine rated torque at each engine speed, corresponding to line F in FIG. 3. The "normal torque" as a function of engine speed can also be obtained by table look-up, and normally appears as the upper curve in FIG. 3. These newly calculated maximum engine speed and engine torque values are fed directly to the engine control routines 30 to reduce the engine performance.

After the new engine operating values have been calculated and sent to the engine control routine 30, the engine protection protocol returns to read a new sensor and ascertain a new set of fault information and engine derating indices. The manner in which this engine protection protocol is implemented for a specific ECM depends upon the type of microprocessor, memory capabilities, and engine control routines of the ECM. The specific software required to execute this protection protocol is determined by the specific ECM and can be left to a person of ordinary skill to develop.

The engine protection protocol of the present invention contemplates that the engine is still running during application of the engine derating schedules. One object of the invention is to provide visual warnings to the driver that a fluid fault condition exists that may threaten the engine. Another object is to cause the driver to alter his driving behavior when a fault is detected so as to minimize a fluid parameter fault condition and reduce the risk of engine failure. Thus, engine power and speed derating schedules are applied by the present invention to noticeably reduce or derate the engine performance, thereby prompting the driver to stop the engine as soon as possible.

However, an additional failsafe routine may be added to the ECM 10 of the engine protection routine 35 that automatically shuts the engine down after a highest fault degree has been reached. This failsafe routine may be similar to similar known routines and may operate to completely stop fuel flow to the injectors, such as by energizing fuel shutoff valve 21.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for protection of an internal combustion engine having an electronic engine control module with engine control routines for controlling the engine performance, comprising the continuously repeated steps of:
   monitoring a number of engine fluid parameters during operation of the engine;
   determining whether a fault condition exists as to one or more of the fluid parameters;
   determining a degree of reduction of the engine performance as a function of the severity of the fluid parameter fault condition and generating engine derating information indicative of this degree of reduction; and
   providing the engine derating information to the engine control routines to modify the engine performance while permitting the engine to continue operating.

2. The method for protection of claim 1, wherein: in the step of determining a degree of reduction of engine performance, the severity of the fault condition is determined by the amount of time that the fluid parameter exceeds a first limit value, whereby the degree of reduction of the engine performance increases as such amount of time increases.

3. The method for protection of claim 1, wherein: in the step of determining a degree of reduction of engine performance, the severity of the fault condition is determined by the difference between the magnitude of the sensed fluid parameter at the fault condition and a first limit value, whereby the degree of reduction of the engine performance increases as such difference increases.

4. The method for protection of claim 1, wherein the step of determining a degree of reduction of engine performance includes the steps of:
   determining whether the fault condition falls within a first fault level or a second fault level;
   implementing an engine power derating schedule when a first fault level occurs to reduce the available engine torque at all engine speeds, with the amount of reduction of available torque being dependent upon the severity of the fluid fault condition; and
   implementing an engine speed derating schedule when a second fault level occurs to reduce the maximum allowable engine speed, with the amount of reduction of engine speed being dependent upon the severity of the fluid fault condition.

5. The method for protection of claim 4, wherein: in the step of implementing an engine power derating schedule, the severity of the fault condition is determined by the amount of time that the fluid parameter exceeds a first limit value, whereby the amount of available torque is decreased as such amount of time increases.

6. The method for protection of claim 4, wherein: in the step of implementing an engine power derating schedule, the severity of the fault condition is determined by the difference between the magnitude of the sensed fluid parameter at the fault condition and a first limit value, whereby the amount of available torque is decreased as such difference increases.

7. The method for protection of claim 4, wherein: in the step of implementing an engine speed derating schedule, the severity of the fault condition is determined by the amount of time that the fluid parameter exceeds a second limit value, whereby the maximum allowable engine speed is decreased as such amount of time increases.

8. The method for protection of claim 6, wherein: the steps of implementing an engine power derating schedule and implementing an engine speed derating schedule are sequentially performed; and in the step of implementing an engine speed derating schedule, the severity of the fault condition is determined by the amount of time that the fluid parameter exceeds a second limit value, the second limit value being greater than the first limit value, whereby the maximum allowable engine speed is decreased as such amount of time increases.

9. The method for protection of claim 1, wherein the step of determining whether a fault condition exists includes the steps of waiting for a predetermined time period after a fault condition has been detected and determining whether the fault condition still exists at the end of the predetermined time period to filter instantaneous changes in the magnitude of the sensed fluid parameter.

10. The method for protection of claim 1, wherein the step of determining a degree of reduction of the engine performance includes the steps of filtering the reduction of the engine performance as a function of time and generating filtered engine derating information over a predetermined time period to filter instantaneous changes in the engine derating information.

11. A protection system for an internal combustion engine for use with an electronic engine control module implementing engine control routines for controlling engine performance, the system comprising:
   means for sensing the magnitude of a number of engine fluid parameters;
   means for determining whether a fault condition exists as to one or more of said fluid parameters by comparing said magnitude of one each of said number of fluid parameters to a number of limit values corresponding to said one each of said fluid parameters;
   engine protection means, including a microprocessor, for generating data usable by the engine control routines, said engine protection means including;
   means for determining the severity of said fault condition; and means for calculating derating information as a function of the severity of said fault condition, wherein said data includes said derating information adapted to be used by the engine control routines to reduce engine performance.

12. The protection system for an internal combustion engine of claim 11, wherein said means for determining whether a fault condition exists further includes means for waiting for a predetermined time period after a fault condition has been detected and means for determining whether the fault condition still exists at the end of the predetermined time period to filter instantaneous changes in the magnitude of the sensed fluid parameter.

13. The protection system for an internal combustion engine of claim 11, wherein said engine protection means includes filter means for generating filtered data usable by the engine control routines, said filter means further including means for calculating filtered derating information as a function of time and over a predetermined time period to filter instantaneous changes in the derating information.

14. The protection system for an internal combustion engine of claim 11, wherein:
said means for determining the severity of said fault condition includes means for determining whether said fault condition falls within a first fault level or a second fault level; and
said means for calculating derating information includes means for calculating an engine power derating schedule when the first fault level occurs and means for calculating an engine speed derating schedule when the second fault level occurs, said engine power derating schedule reducing available engine torque at all engine speeds and said engine speed derating schedule reducing the maximum allowable engine speed.

15. The protection system for an internal combustion engine of claim 14, wherein said engine power derating schedule reduces the available torque at peak torque engine speed in greater amounts in comparison with the reduction of available torque at higher engine speeds.

16. The protection system for an internal combustion engine of claim 15, wherein said engine protection means further includes first order filter means for calculating a filtered power derating schedule as a function of time and over a first predetermined time period and second order filter means for calculating a filtered speed derating schedule as a function of time and over a second predetermined time period to filter instantaneous changes in the power derating schedule and the speed derating schedule.

17. A method for protection of an internal combustion engine having an electronic engine control module for controlling the engine performance according to preprogrammed performance characteristics, comprising the continuously repeated steps of:
monitoring a number of engine operating parameters indicative of engine condition during operation of the engine;
determining whether a fault condition exists as to one or more of the engine operating parameters;
derating the preprogrammed engine performance characteristics as a function of the severity of the fault condition to permit continued engine operation according to the derated performance characteristics during the fault condition.

18. The method for protection of claim 17, wherein the step of derating the preprogrammed engine performance includes implementing an engine power derating schedule when a first fault level occurs to reduce the available engine torque at all engine speeds, with the amount of reduction of available torque being dependent upon the severity of the fault condition.

19. The method for protection of claim 18 wherein the engine power derating schedule reduces the available torque at peak torque engine speed in greater amounts in comparison with the reduction of available torque at higher engine speeds.

20. The method for protection of claim 19, wherein the step of derating the preprogrammed engine performance includes implementing an engine speed derating schedule when a second more severe fault level occurs to reduce the maximum allowable engine speed, with the amount of reduction of engine speed being dependent upon the severity of the fault condition.

21. The method for protection of claim 20, wherein the step of determining whether a fault condition exists includes the steps of waiting for a predetermined time period after a fault condition has been detected and determining whether the fault condition still exists at the end of the predetermined time period to filter instantaneous changes in the magnitude of the sensed engine operating parameter.

22. The method for protection of claim 21, wherein the step of derating the preprogrammed engine performance characteristic includes the steps of filtering the derated performance characteristics as a function of time and over a predetermined time period to filter instantaneous changes in the derated engine performance characteristics.

* * * * *

UNITED STATES PATENT AND TRADEMARK OFFICE
CERTIFICATE OF CORRECTION

PATENT NO. : 5,070,832

DATED : December 10, 1991

INVENTOR(S) : Hapla et al

It is certified that error appears in the above-identified patent and that said Letters Patent is hereby corrected as shown below:

The sheet of drawing consisting of Fig.1, should be deleted to be replaced with Fig. 1, as shown on the attached page.

Signed and Sealed this

Twelfth Day of April, 1994

*Attest:*

BRUCE LEHMAN

*Attesting Officer*

Commissioner of Patents and Trademarks

Fig. 1